(12) United States Patent
Hosoyama et al.

(10) Patent No.: US 9,742,284 B2
(45) Date of Patent: Aug. 22, 2017

(54) MULTIPHASE POWER CIRCUIT

(71) Applicant: FUJITSU LIMITED, Kawasaki-shi, Kanagawa (JP)

(72) Inventors: Hisato Hosoyama, Yokohama (JP); Tomotake Sasaki, Kawasaki (JP); Yu Yonezawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 15 days.

(21) Appl. No.: 14/858,294

(22) Filed: Sep. 18, 2015

(65) Prior Publication Data

US 2016/0105114 A1    Apr. 14, 2016

(30) Foreign Application Priority Data

Oct. 9, 2014  (JP) ................................. 2014-208425

(51) Int. Cl.
  *G05F 1/00* (2006.01)
  *H02M 3/28* (2006.01)
  *H02M 3/335* (2006.01)

(52) U.S. Cl.
  CPC ......... *H02M 3/285* (2013.01); *H02M 3/3353* (2013.01); *H02M 3/33592* (2013.01); *Y02B 70/1475* (2013.01)

(58) Field of Classification Search
  CPC ....... H02M 3/1584; H02M 2003/1586; H02M 3/285; H02M 3/3353; H02M 3/33592; H02M 7/08; H02M 7/493; H02J 1/102; H02J 2001/104; H02J 2001/106; Y02B 70/1475

USPC ...... 323/268, 271, 272, 350; 363/65, 69, 71, 363/72

See application file for complete search history.

(56) References Cited

U.S. PATENT DOCUMENTS

| | | | |
|---|---|---|---|
| 8,711,586 B2* | 4/2014 | Yamada | H02M 1/14 363/41 |
| 2006/0034364 A1* | 2/2006 | Breitzmann | H02M 7/53871 375/238 |
| 2008/0129259 A1* | 6/2008 | Endo | H02M 3/1584 323/271 |
| 2009/0256535 A1* | 10/2009 | Houston | H02M 3/1584 323/262 |
| 2011/0141777 A1* | 6/2011 | Sakakibara | H02M 5/4585 363/69 |

FOREIGN PATENT DOCUMENTS

| | | |
|---|---|---|
| JP | 2004-56838 | 2/2004 |
| JP | 2006-340442 | 12/2006 |

* cited by examiner

*Primary Examiner* — Alex Torres-Rivera
(74) *Attorney, Agent, or Firm* — Staas & Halsey LLP

(57) ABSTRACT

A power circuit includes: first and second switching circuits coupled in parallel between an input terminal and an output terminal; a control signal generator that performs an ON/OFF control of the first and second switching circuits individually and generates a first control signal and a second control signal having different phases; a frequency converter that converts a frequency of the first control signal after converting a frequency of the second control signal; and a phase shifter that shifts the phase of the second control signal when a first interrupt is introduced as the first control signal is turned ON after the frequency converter has converted the frequency of the second control signal.

13 Claims, 20 Drawing Sheets

MULTIPHASE POWER CIRCUIT

CROSS-REFERENCE TO RELATED APPLICATION

This application is based upon and claims the benefit of priority of the prior Japanese Patent Application No. 2014-208425, filed on Oct. 9, 2014, the entire contents of which are incorporated herein by reference.

FIELD

The embodiments discussed herein are related to a power circuit, and more specifically to a power circuit including a plurality of switching circuits.

BACKGROUND

As a power circuit, there is known, for example, a DC-to-DC converter that converts a DC (direct current) voltage. For example, in an information processing device such as a server or a home appliance, an AC voltage is converted to a DC voltage using a rectifier and a power factor correcting circuit. Then, the DC voltage is stepped down using a DC-to-DC converter.

As such a DC-to-DC converter, there is known a multiphase switching power circuit in which a plurality of switching circuits having different phases is connected in parallel between an input terminal and an output terminal.

In a switching power circuit, a switching frequency may vary depending on the size of a load in order to improve efficiency. In a multiphase switching power supply, however, when the switching frequency is changed to improve the efficiency of the power circuit, the timings of frequency conversion may be misaligned due to the plurality of switching circuits. As a result, the frequencies may not be switched properly.

The following are reference documents.
[Document 1] Japanese Laid-Open Patent Publication No. 2004-056838 and
[Document 2] Japanese Laid-Open Patent Publication No. 2006-340442.

SUMMARY

According to an aspect of the invention, a power circuit includes: first and second switching circuits coupled in parallel between an input terminal and an output terminal; a control signal generator that performs an ON/OFF control of the first and second switching circuits individually and generates a first control signal and a second control signal having different phases; a frequency converter that converts a frequency of the first control signal after converting a frequency of the second control signal; and a phase shifter that shifts the phase of the second control signal when a first interrupt is introduced as the first control signal is turned ON after the frequency converter has converted the frequency of the second control signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, exemplary embodiments of the present disclosure will be described with reference to the accompanying drawings.

First Embodiment

Figure 1:
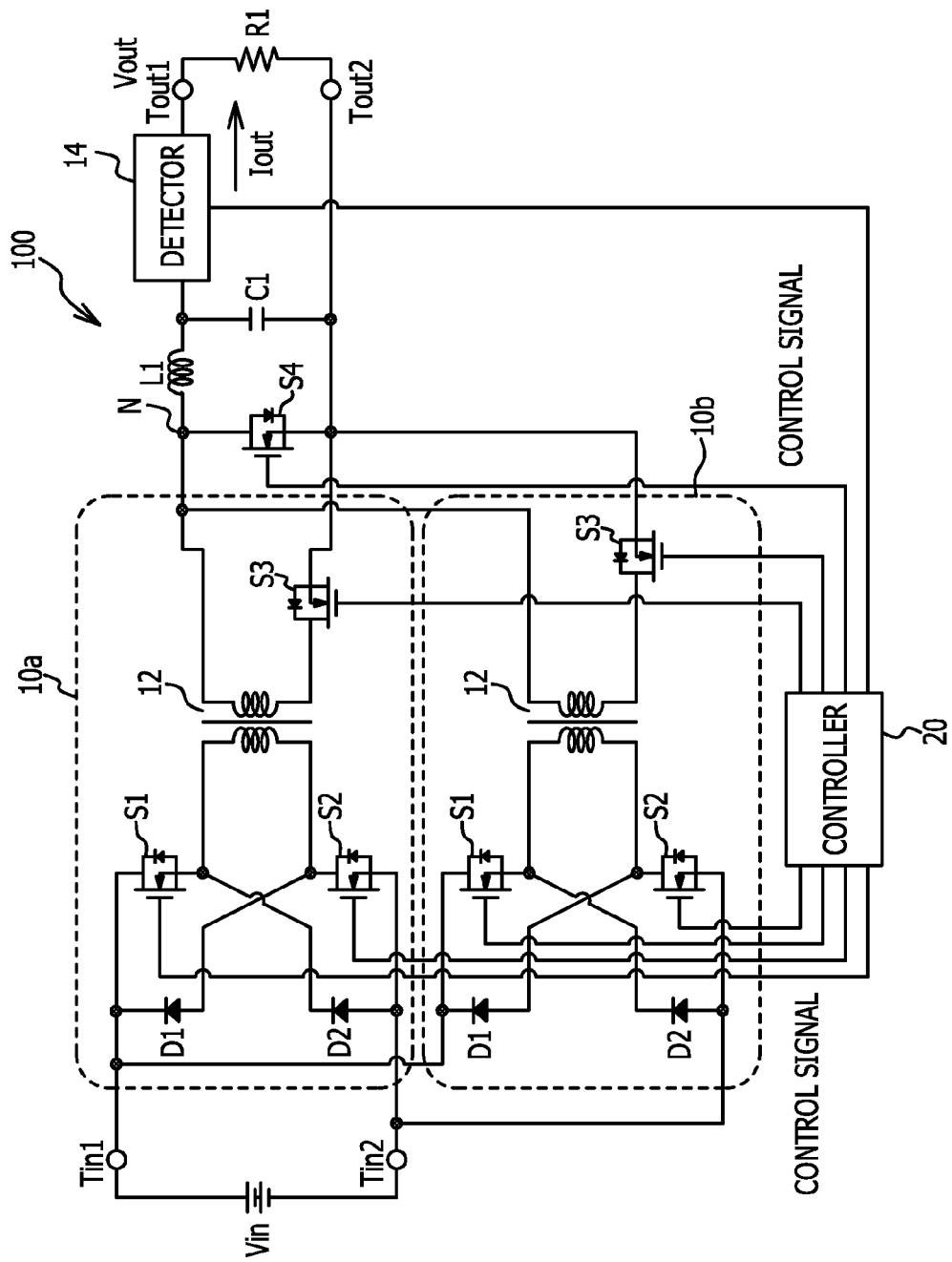
FIG. 1 is a view illustrating a circuit diagram of a power circuit according to a first embodiment of the present disclosure.

FIG. 1 is a view illustrating a circuit diagram of a power circuit according to a first embodiment. As illustrated in FIG. 1, the power circuit 100 according to the first embodiment includes a plurality of switching circuits 10a and 10b, and a controller 20. The switching circuits 10a and 10b are connected in parallel to each other between input terminals Tin1 and Tin2 and output terminals Tout1 and Tout2. The switching circuits 10a and 10b have different phases with each other (e.g., phase-A and phase-B).

A DC power source with an input voltage Vin is connected to the input terminals Tin1 and Tin2. Each of the input terminals Tin1 and Tin2 is a plus-side terminal and a minus-side terminal, respectively. The DC power source corresponds to, for example, an AC-to-DC converter that converts an AC voltage to a DC voltage. A load R1 is connected between the output terminals Tout1 and Tout2. The load R1 corresponds to, for example, an internal circuit of an information processing device or a home appliance. Each of the output terminals Tout1 and Tout2 is a plus-side terminal and a minus-side terminal, respectively. A capacitor C1 is connected between the output terminals Tout1 and Tout2. An inductor L1 is connected between a node N and the output terminal Tout1. A switch S4 is connected between the node N and the output terminal Tout2. An output voltage Vout is output between the output terminals Tout1 and Tout2. A current flowing through the load R1 is referred to as an output current Iout. A detector 14 detects the output voltage Vout and the output current Iout, and outputs signals indicating the values of the output voltage Vout and the output current Iout to the controller 20.

Each of the switching circuits 10a and 10b includes switches S1 to S3, diodes D1 and D2, and a transformer 12. The input terminal Tin1 is connected to one end of the switch S1, and is connected to one end of the switch S2 via the diode D1 in its reverse direction. The input terminal Tint is connected to the other end of the switch S2, and is connected to the other end of the switch S1 via the diode D2 in its forward direction. The other end of the switch S1 and one end of the switch S2 are connected to the primary winding of the transformer 12. The secondary winding of the transformer 12 is connected to the output terminal Tout2 via the node N and the switch S3. The switches S1 to S4 are, for example, metal oxide semiconductor field effect transistors (MOSFETs). The switches S1 to S4 may be elements other than FETs, such as, for example, insulated gate bipolar transistors (IGBTs).

The controller 20 generates control signals to control the switches S1 to S4 based on the signals corresponding to the output voltage Vout and the output current Iout detected by the detector 14. The control signals are used for controlling the switches S1 to S4 in a pulse width modulation (PWM) manner, for example. For example, the switches S1 to S3 are turned on when the level of the control signal is high, while the switches S1 to S3 are turned off when the level of the control signal is low. The controller 20 is, for example, a processor such as a micro processing unit (MPU) and a central processing unit (CPU).

Figure 2:
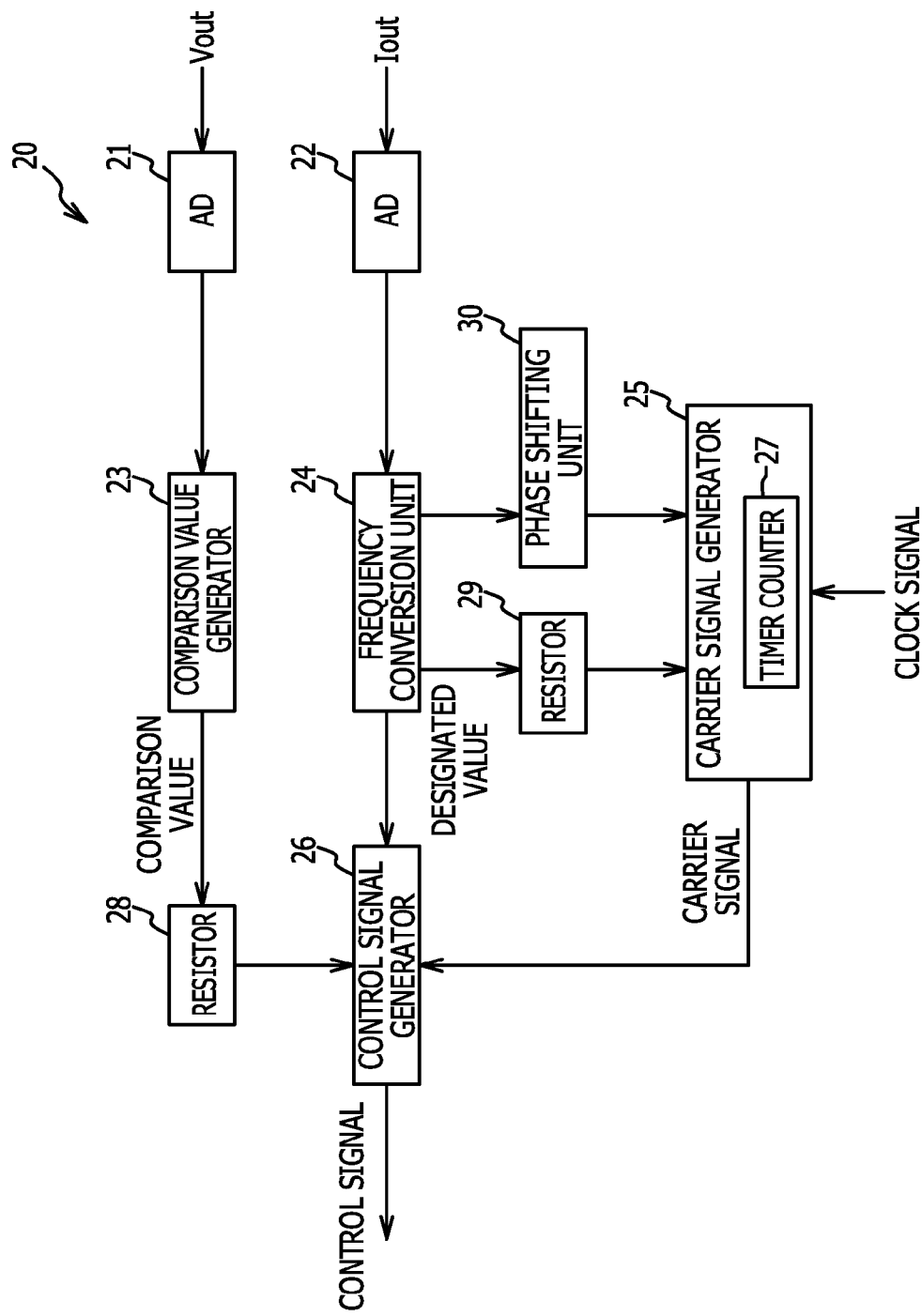
FIG. 2 is a view illustrating a functional block diagram of a controller according to the first embodiment.

FIG. 2 is a view illustrating a functional block diagram of the controller according to the first embodiment. As illustrated in FIG. 2, the controller 20 functions as analog-to-digital (AD) converters 21 and 22, a comparison value generator 23, a frequency conversion unit 24, a carrier signal generator 25, a control signal generator 26, resistors 28 and 29, and a phase shifting unit 30. The AD converters 21 and 22 convert analog signals corresponding to the output voltage Vout and the output current Iout to digital signals, respectively. The comparison value generator 23 generates a comparison value based on the output voltage Vout. The resistor 28 maintains the comparison value.

The frequency conversion unit 24 converts a switching frequency based on the output current Iout. The frequency conversion unit 24 generates a designated value corresponding to the switching frequency. The resistor 29 maintains the designated value. The carrier signal generator 25 includes a timer counter 27, and generates carrier signals having the phase-A and the phase-B, respectively, based on a clock signal and the designated value maintained by the resistor 29.

The control signal generator 26 compares the carrier signals having the phase-A and the phase-B, respectively, with the comparison value maintained by the resistor 28, to generate control signals having the phase-A and the phase-B for turning ON/OFF the switching circuits 10a and 10b, respectively. The phase shifting unit 30 shifts the phase of the carrier signal having the phase-B when the frequency conversion unit 24 converts the frequency of the carrier signal.

Figure 3:
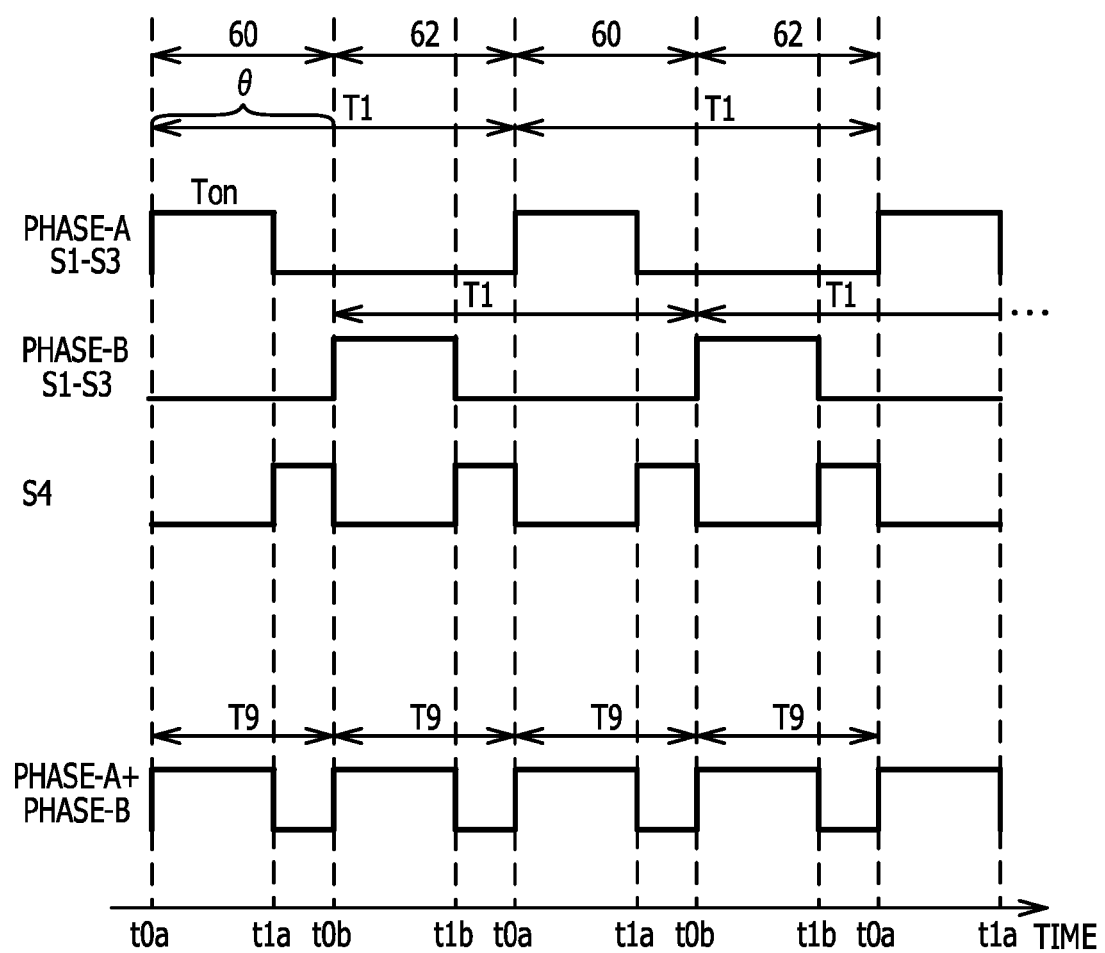
FIG. 3 is a timing chart illustrating a control over respective switches in the first embodiment.

FIG. 3 is a timing chart illustrating a control over respective switches in the first embodiment. As illustrated in FIG. 3, the periods of control signals for both of the switching circuits 10a and 10b are the same, T1. The phase difference θ between the phase-A and phase-B is 180°. At time t0a, the switches S1 to S3 operated under the control signal having the phase-A (hereinafter referred to as the switches S1 to S3 of the phase-A) are turned ON. The switches S1 to S3 of the phase-B and the switch S4 are turned OFF. At time t1a, the switches S1 to S3 of the phase-A are turned OFF. The switch S4 is turned ON. At time t0b, the switches S1 to S3 of the phase-B are turned ON. The switch S4 is turned OFF. At time t1b, the switches S1 to S3 of the phase-B are turned OFF. The switch S4 is turned ON. Subsequently, the same repeats from time t0a.

A time period after the switches S1 to S3 of the phase-A are turned ON at time t0a until the switches S1 to S3 of the phase-B are turned ON at time t0b is referred to as a phase-A time period 60. A time period from time t0b to time t0a is referred to as a phase-B time period 62. A duty ratio refers to $T_{ON}/T1$, where $T_{ON}$ is a time period in which the switches S1 to S3 are turned ON. The duty ratios of the control signals of the phase-A and phase-B are 50% or below, so that the ON-periods of the control signals having the phase-A and the phase-B do not overlap with each other. The ON/OFF timing of the switch S3 may be different from the ON/OFF timing of the switches S1 and S2 to the extent that it functions as a power circuit. By adding the control signal having the phase-A to the control signal having the phase-B, a voltage from the positive-side is applied to the node N when the switches S1 to S3 of one of the switching circuits 10a and 10b are turned ON.

When the switches S1 to S3 of both of the switching circuits 10a and 10b are turned OFF, a voltage from the negative-side is applied to the node N. The voltage at the node N is smoothed by the inductor L1 and the capacitor C1 to be the output voltage Vout. The added control signal (hereinafter referred to as the signal of the phase-A plus the phase-B) has the period of T9, which is half the period T1. Accordingly, the multiphase switching circuit may have a higher switching frequency. Accordingly, for example, the size of the inductor L1 may be reduced.

Figure 4:
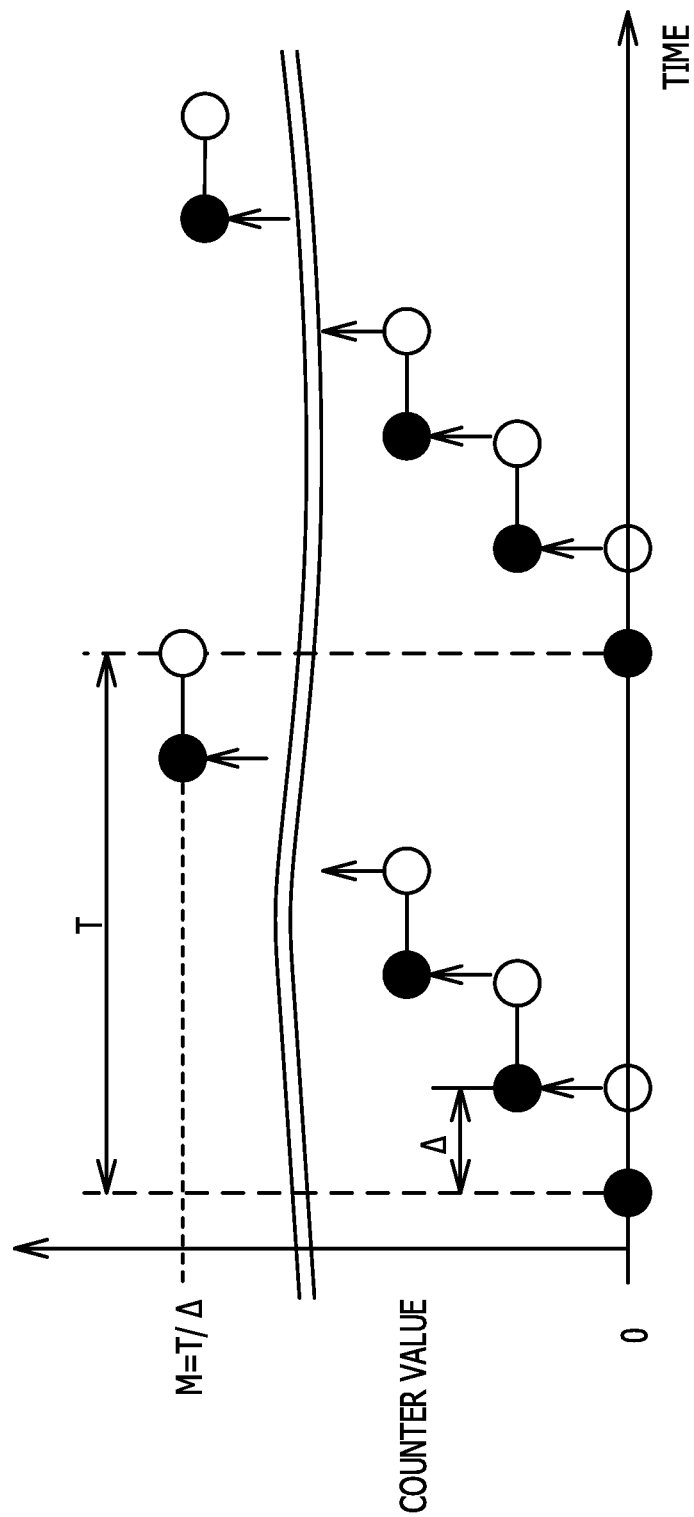
FIG. 4 is a timing chart illustrating a method of generating a carrier signal according to the first embodiment.

FIG. 4 is a timing chart illustrating a method of generating a carrier signal according to the first embodiment. As illustrated in FIG. 4, the timer counter 27 of the carrier signal generator 25 generates a carrier signal based on a designated value M and a clock signal. The symbol T denotes the period of a carrier signal, and A denotes the period of a clock signal. The period T is, for example, an integer multiple of the period Δ. The designated value M maintained by the resistor 29 is acquired at the timing when the count value returns to the initial value of zero (0). The timer counter 27 counts up a count value at every period Δ of the clock signal.

When the count value reaches the designated value M, the timer counter 27 sets the count value to the initial value which is, for example, zero (0). The designated value M corresponds to T/Δ. Again, the timer counter 27 counts up the count value at every period Δ of the clock signal. In this manner, a carrier signal having a saw tooth waveform may be generated from the count values. The frequency of the carrier signal is converted by changing the designated value M. Accordingly, the amplitude of the carrier signal is changed. When the period Δ of the clock signal is constant, the period of the carrier signal is converted. Although the timer counter 27 counts up in the example illustrated in FIG. 4, the timer counter 27 may count down. As described above, the carrier signal generator 25 generates a carrier signal having a saw tooth waveform that increases or decreases monotonously with time from the initial value of zero (0) and returns to the initial value after reaching the designated value. In the drawings below, the stair-like step of a carrier signal is roughly depicted as a straight line.

Figure 5:
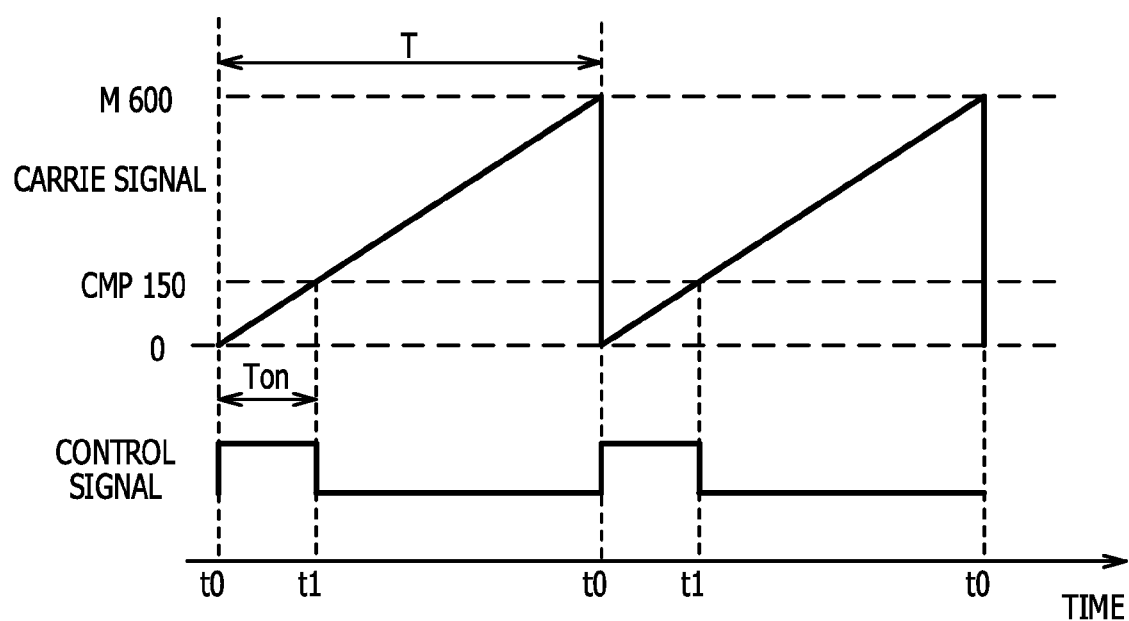
FIG. 5 is a timing chart illustrating a method of generating a control signal according to the first embodiment.

FIG. 5 is a timing chart illustrating a method of generating a control signal according to the first embodiment. As illustrated in FIG. 5, the control signal generator 26 generates a control signal at a HIGH level when the carrier signal is lower than a comparison value CMP (150 in FIG. 5) maintained by the resistor 28, and generates a control signal at a LOW level when the carrier signal is higher than the comparison value CMP. The switches S1 to S3 are turned ON when the level of the control signal is HIGH, and the switches S1 to S3 are turned OFF when the level of the control signal is LOW.

At time t0, the carrier signal is zero (0), and the level of the control signal is HIGH. The carrier signal increases with time, and the level of the control signal becomes LOW when the carrier signal reaches the comparison value CMP at time t1. At time t0, the carrier signal becomes the designated value M (600 in FIG. 5) and returns to zero (0) again, and the level of the control signal becomes HIGH. The comparison value generator 23 decreases the comparison value CMP when the output voltage Vout becomes higher than a target voltage. Accordingly, the duty ratio $T_{ON}/T$ of the control signal decreases, and the output voltage Vout is lowered. The comparison value generator 23 increases the comparison value CMP when the output voltage Vout becomes lower than the target voltage. Accordingly, the duty ratio $T_{ON}/T$ of the control signal increases, and the output voltage Vout is increased.

Figure 6:
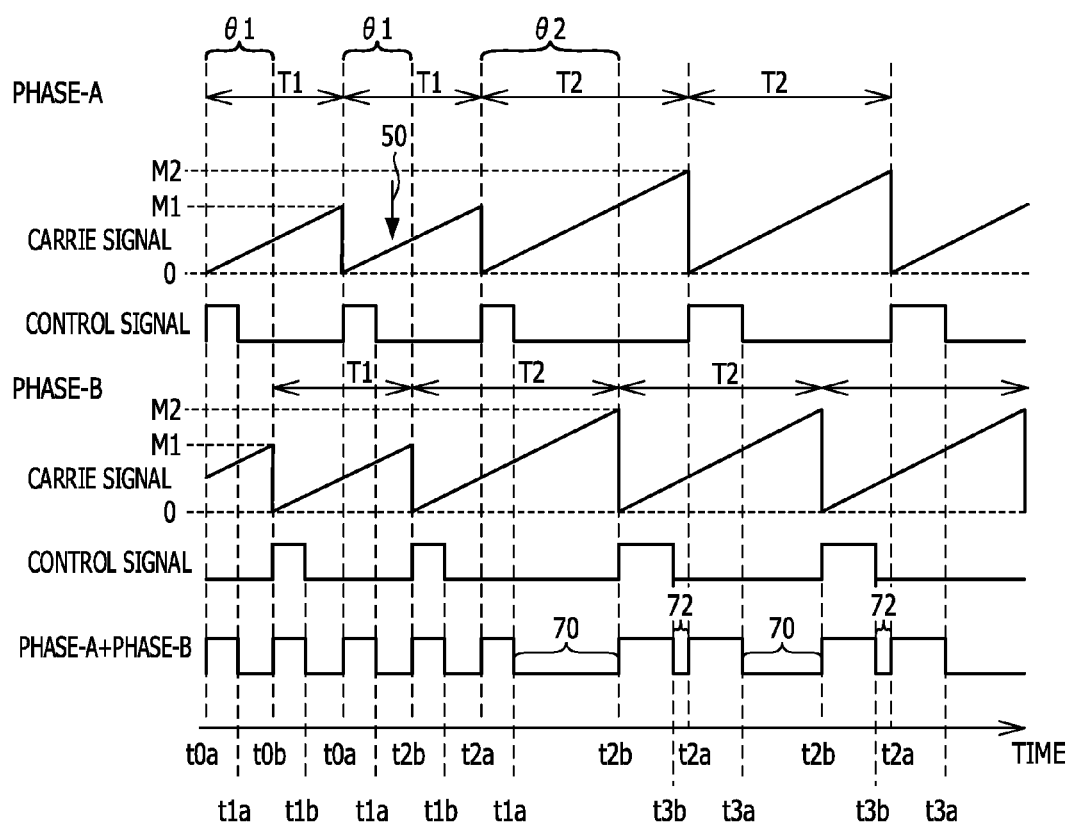
FIG. 6 is a timing chart illustrating a conversion of switching frequency according to Comparative Example 1.
Figure 7:
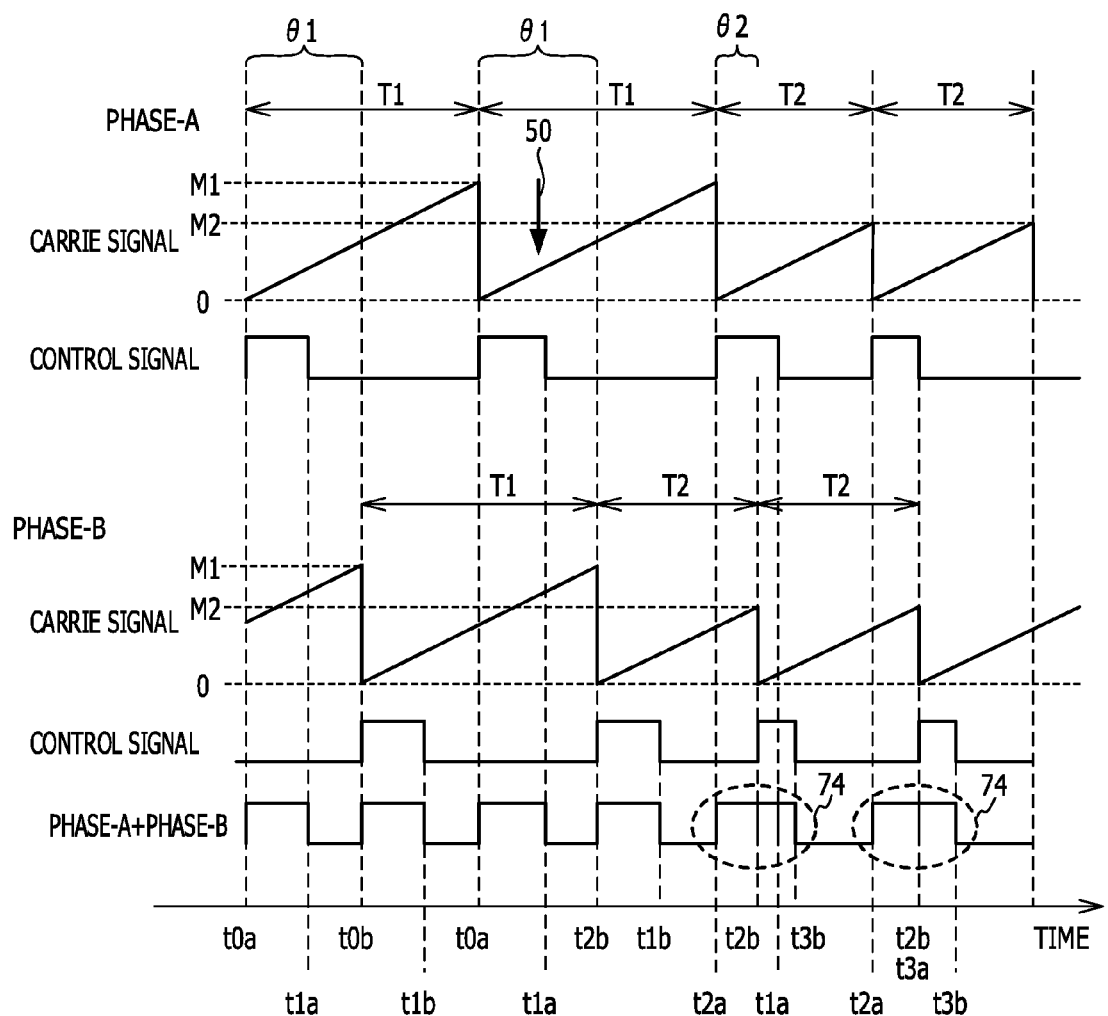
FIG. 7 is another timing chart illustrating a conversion of switching frequency according to Comparative Example 1.

Comparative Example 1 will be described first, in which no phase is shifted. FIGS. 6 and 7 are timing charts illustrating a conversion of the switching frequency in Comparative Example 1. FIG. 6 illustrates an example of increasing the period from T1 to T2. In other words, the switching frequency is decreased in the example illustrated in FIG. 6. FIG. 7 illustrates an example of decreasing the period from T2 to T1. In other words, the switching frequency is increased in the example illustrated in FIG. 7.

As illustrated in FIGS. 6 and 7, the phase difference θ1 between the carrier signal having the phase-A and the carrier signal having phase-B is 180°. At time t0a, the carrier signal having the phase-A returns to zero (0). At time t0b, the carrier signal having the phase-B returns to zero (0). Accordingly, the levels of the control signals having the phase-A and phase-B become HIGH. At times t1a and t1b, the levels of the control signals having the phase-A and phase-B become LOW. The designated value M maintained by the resistor 29 at this time is M1. At the time point indicated by arrow 50, the frequency conversion unit 24 replaces the designated value M1 maintained by the resistor 29 with a designated value M2 in order to convert the switching frequency. Then, the newly designated value M2 is used when counting up is started in another period.

When the carrier signal having the phase-B returns to the initial value 0 at time t2b, the carrier signal increases until it reaches the designated value M2. Accordingly, the period of the carrier signal becomes T2. After time t2a, the period of the carrier signal having the phase-A becomes T2. In FIG. 6, the phase difference θ2 between the phase-A and the phase-B becomes larger than 180°. Accordingly, intervals between ON-periods of the added control signal of the phase-A plus the phase-B become wider at locations 70, while intervals between ON-periods of the signal of the phase-A plus the phase-B become narrower at locations 72.

In FIG. 7, the phase difference θ2 between the phase-A and the phase-B becomes smaller than 180°. Accordingly, the periods in which the level of the signal having the phase-A is HIGH overlap the periods in which the level of the signal having the phase-B is HIGH, for example, at locations 74. At this time, as the switches S1 to S3 of both of the switching circuits 10a and 10b are turned ON, a through current may flow so that the switching power supply may be broken.

As described above, according to Comparative Example 1, the phase difference between the phase-A and the phase-B deviates from 180° when the switching frequency is converted. As a result, the waveform of the signal of the phase-A plus the phase-B becomes uneven. In some instances, the levels of the control signals having the phase-A and the phase-B become HIGH simultaneously, so that a through current flows.

In the embodiment to be described below, the phase difference between the phase-A and the phase-B is suppressed from deviating.

Figures 8A, 8B, 8C:
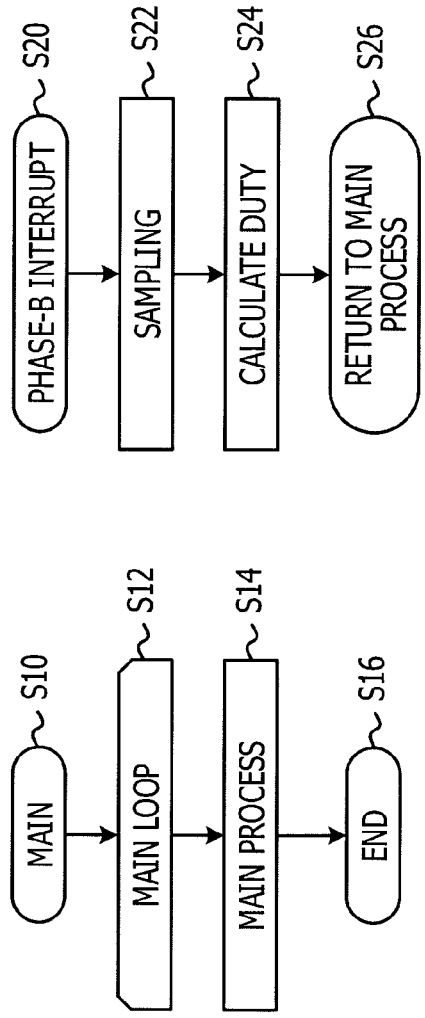
FIGS. 8A to 8C are flowcharts illustrating a control by the controller according to the first embodiment.
Figure 9:
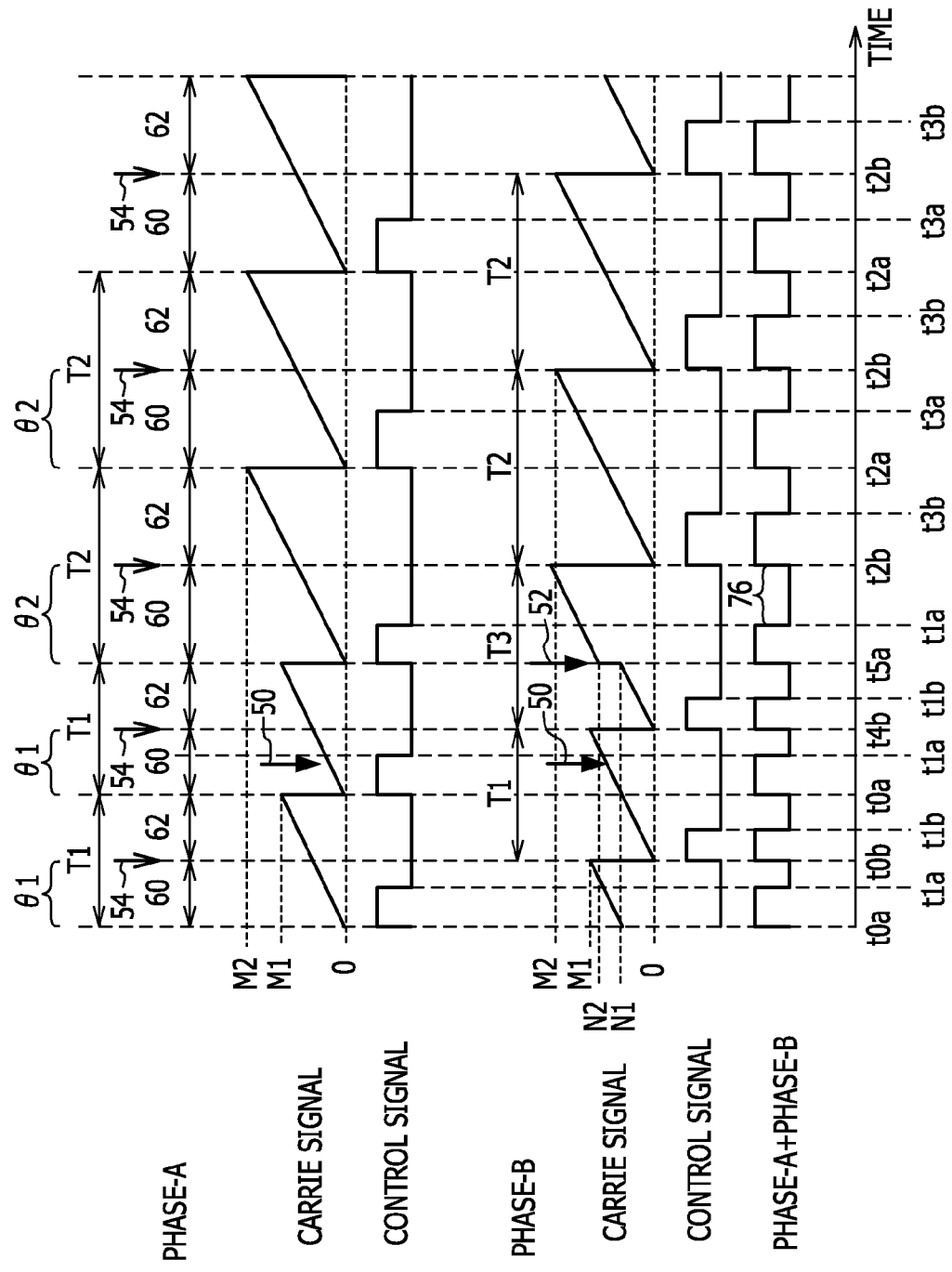
FIG. 9 is a timing chart illustrating a conversion of switching frequency according to the first embodiment.
Figure 10:
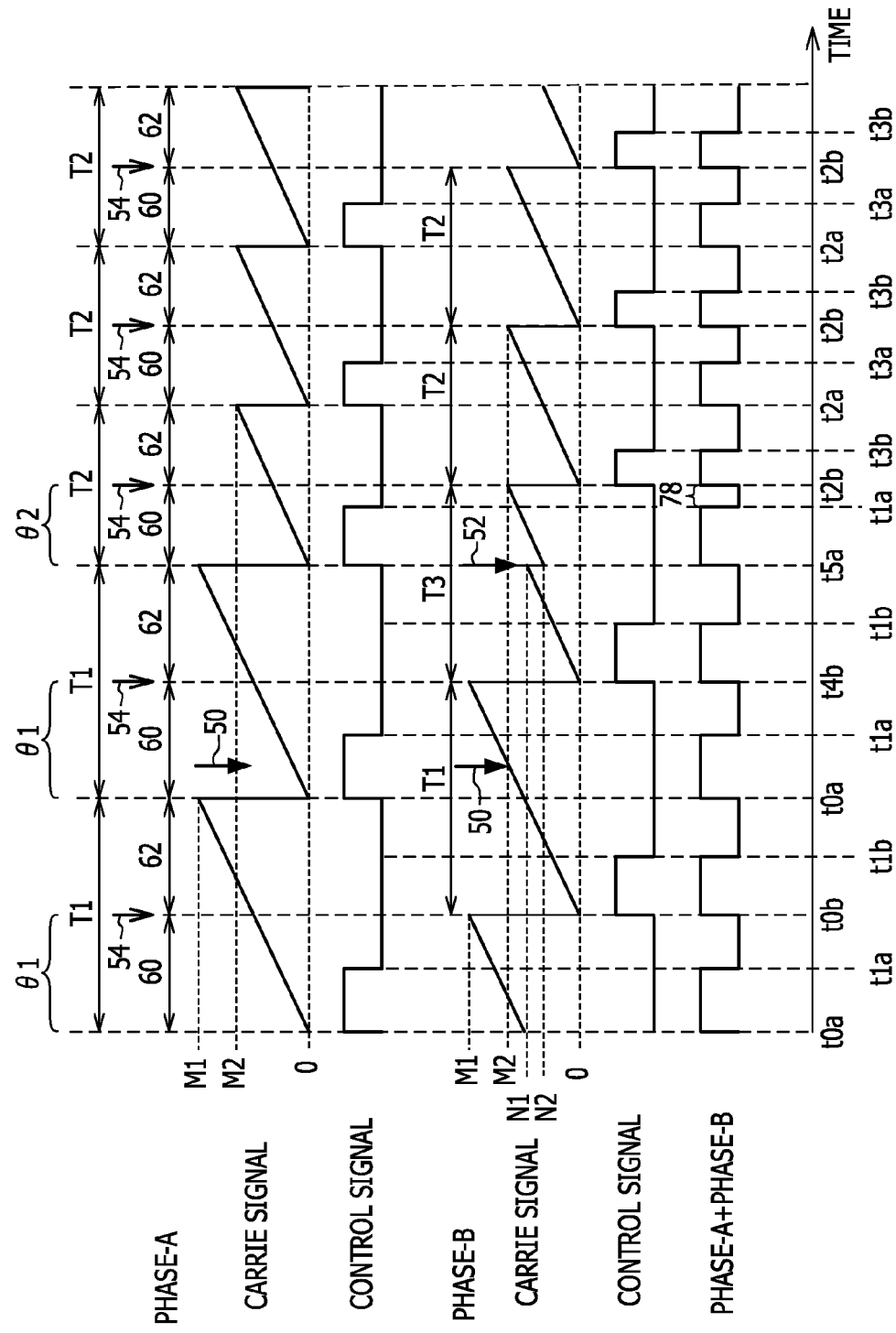
FIG. 10 is another timing chart illustrating a conversion of switching frequency according to the first embodiment.

FIGS. 8A to 8C are flowcharts illustrating a control by the controller according to the first embodiment. FIGS. 9 and 10 are timing charts illustrating a conversion of the switching frequency in the first embodiment. FIG. 9 illustrates an example of decreasing the switching frequency. FIG. 10 illustrates an example of increasing the switching frequency.

As illustrated in FIG. 8A, in a main flow S10, a processing S14 is carried out between main loops S12 to S16. In FIG. 8B, when a phase-B interrupt is introduced (step S20) (e.g., the control signal having the phase-B is turned ON), the A/D converters 21 and 22 perform a sampling on the output voltage Vout and the output current Iout, as indicated by arrows 54 in FIGS. 9 and 10 (step S22). The comparison value generator 23 calculates the duty ratios of the control signals based on the output voltage Vout (step S24). For example, the duty ratio is increased if the output voltage Vout is lower than the target voltage, and the duty ratio is decreased if the output voltage Vout is higher than the target voltage. The process returns to the main processing loop after the calculation is completed (step S26).

In FIG. 8C, when a phase-A interrupt (e.g., the interrupt when the control signal having the phase-A is turned ON) is introduced (step S30), the comparison value generator 23 sets the comparison values in the resistor 28 for the phase-A and phase-B (step S32). The frequency conversion unit 24 determines whether the switching frequency is to be converted based on the output current Iout (step S34). If it is determined that the switching frequency is not converted ("NO" in step S34), the process returns to the main processing loop (step S40). If it is determined that the switching frequency is converted ("YES" in step S34), the frequency conversion unit 24 sets the designated value in the resistor 29 (step S36). The phase shifting unit 30 shifts the phase-B, leaving the phase-A unchanged (step S38). Then, the process returns to the main processing loop (step S40).

As illustrated in FIGS. 9 and 10, when the phase-B interrupt is introduced (step S20), sampling on the output voltage Vout and the output current Iout is performed as indicated by arrows 54. Then, in phase-B periods 62, the comparison value generator 23 calculates the duty ratio. In phase-A periods 60 after the phase-A interrupt, the comparison value generator 23 replaces the designated value M1 in the resistor 29 with the designated value M2 as indicated by arrows 50. The next interrupt is the phase-B interrupt introduced at time t4$b$.

Accordingly, the switching frequency of the signal having the phase-B is converted first. At time t5$a$ when the phase-A interrupt is introduced, the phase shifting unit 30 overwrites the counter value for the phase-B maintained by the resister in the carrier signal generator 25 from N1 to N2, as indicated by arrow 52. For example, it is assumed that the counter value N2 equals to M2/2. Accordingly, the period T3 of the signal having the phase-B becomes (T1+T2)/2. In addition, the switching frequency of the signal having the phase-A is converted by the phase-A interrupt. The phase difference θ2 between the phase-A and phase-B becomes 180°.

As such, the duty ratio is calculated in the phase-B period 62. In the phase-A period 60, the resistors 28 and 29 are set. Accordingly, the frequency conversion unit 24 converts the frequency of the carrier signal having the phase-B at time t4$b$. Then, at time t5$a$, the frequency conversion unit 24 converts the frequency of the carrier signal having the phase-A. After the frequency of the carrier signal having the phase-B is converted, the phase shifting unit 30 shifts the phase of the carrier signal having the phase-B if there is a phase-A interrupt at time t5$a$. The phase of the carrier signal is shifted, for example, by rewriting the count value maintained by the resistor. The phase of the carrier signal having the phase-A is not shifted. Timings of other signals are similar to those of Comparative Example 1, and, therefore, will not be described repeatedly.

Figure 11:
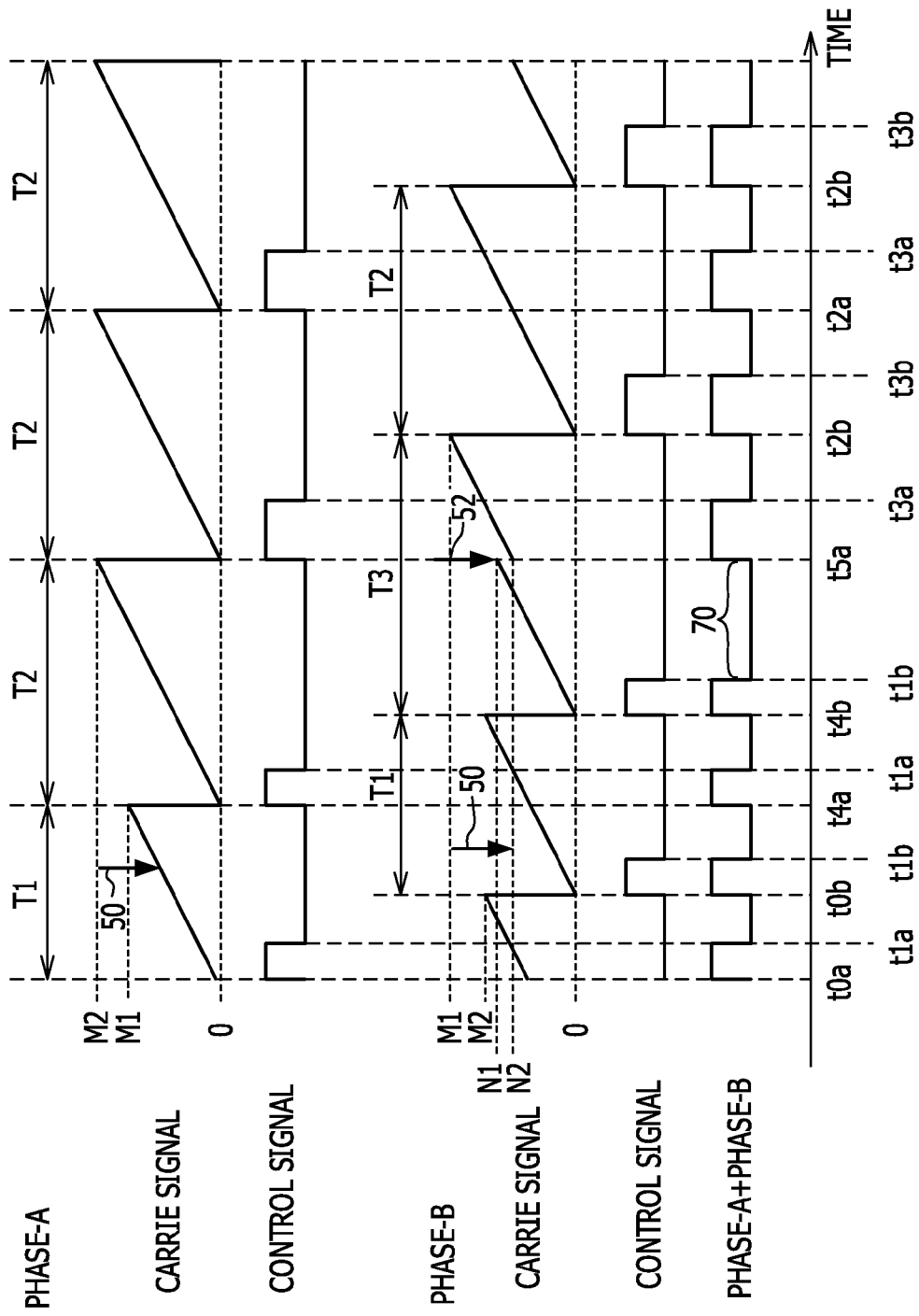
FIG. 11 is a timing chart illustrating a conversion of switching frequency according to Comparative Example 2.
Figure 12:
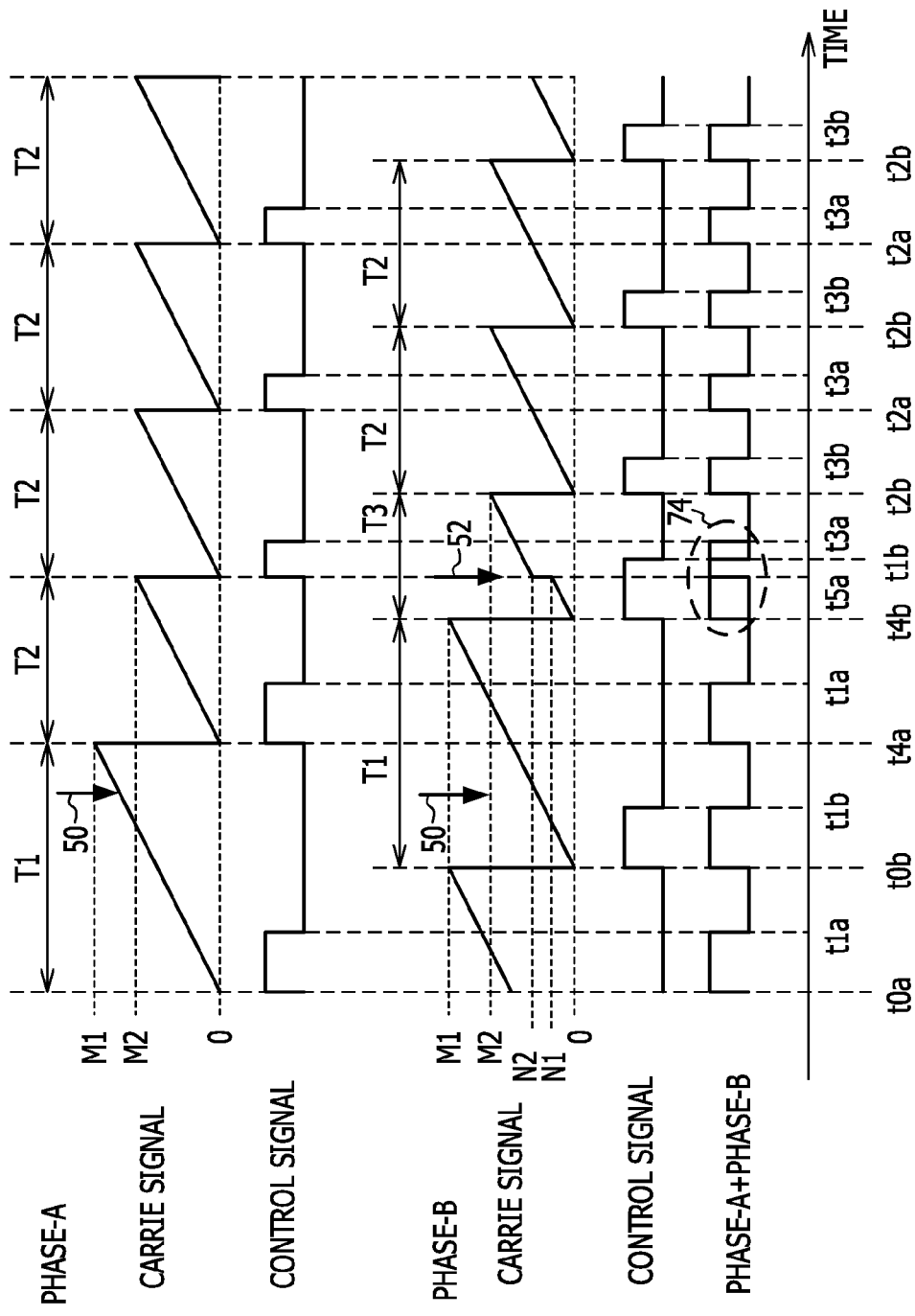
FIG. 12 is another timing chart illustrating a conversion of switching frequency according to Comparative Example 2.

Comparative Example 2 will be described in which the frequency conversion unit 24 converts the frequency of the carrier signal having the phase-A and then converts the frequency of the carrier signal having the phase-B. FIGS. 11 and 12 are timing charts illustrating the conversion of the switching frequency in Comparative Example 2. FIG. 11 illustrates an example of decreasing switching frequencies. FIG. 12 illustrates an example of increasing switching frequencies.

As illustrated in FIGS. 11 and 12, at the time point indicated by arrows 50 in the phase-B period, when the designated value M1 in the resistor 29 is replaced with a designated value M2, the next interrupt is a phase-A interrupt. Accordingly, the switching frequency of the signal having the phase-A is converted first at time t4$a$, and then the switching frequency of the signal having the phase-B is converted at time t4$b$. In order to make the phase difference of 180° between the phase-A and the phase-B after the switching frequency is converted, the phase of the carrier signal having the phase-B is shifted such that the period T3 of the carrier signal having the phase-B meets the relationship: T3=(3×T1−T2)/2. As such, when the phase of the carrier signal having the phase-B is shifted, the period T3 becomes longer in FIG. 11, while the period T3 becomes shorter in FIG. 12.

Accordingly, in FIG. 11, when the period is T3, intervals between ON-periods of the added signal of the phase-A plus the phase-B become wider at locations 70, so that the waveform becomes uneven. In FIG. 12, the ON-periods of the signals having the phase-A and the phase-B overlap with each other at locations 74. Timings of other signals are similar to those of the first embodiment, and, therefore, will not be described repeatedly. As may be seen from Comparative Example 2, the frequency conversion unit 24 may not sequentially convert the frequencies of the carrier signals in an order of the phase-A and the phase-B.

According to the first embodiment, the frequency conversion unit 24 converts the frequency of the carrier signal having the phase-B (second carrier signal) to thereby convert the frequency of the control signal having the phase-B (the second control signal). Then, the frequency conversion unit 24 converts the frequency of the carrier signal having the phase-A (first carrier signal) to thereby convert the frequency of the control signal having the phase-A (first control signal). After the frequency conversion unit 24 converts the frequency of the control signal having the phase-B, if there is a phase-A interrupt (first interrupt) (e.g., the control signal having the phase-A is turned ON), the phase of the carrier signal having the phase-B is shifted, so that the phase of the control signal having the phase-B is shifted. As a result, the waveform of the added signal of the phase-A plus the phase-B becomes even. In this manner, switching frequencies may be converted properly in the multiphase switching power circuit. In addition, the phase of the carrier signal having the phase-B may be shifted within the phase-A time periods 60.

In addition, as illustrated in FIG. 5, the control signal generator 26 compares a comparison value with the carrier signal having the phase-A to generate a control signal having the phase-A. The control signal generator 26 compares the comparison value with the carrier signal having the phase-B to generate a control signal having the phase-B. The frequency conversion unit 24 converts the frequency of the carrier signal to thereby convert the frequency of the control signal. The phase shifting unit 30 shifts the phase of the carrier signal to thereby shift the phase of the control signal. As such, when a control signal is generated by comparing the comparison value with the carrier signal, the waveform of the signal of the phase-A plus the phase-B is likely to be uneven when the frequency is converted. Accordingly, according to the first embodiment, the switching frequency may be converted properly.

The carrier signal generator 25 increases or decreases the counter value monotonously from the initial value and returns the counter value to the initial value if the counter value reaches the designated value, thereby generating carrier signals having the phase-A and the phase-B. When a carrier signal is generated in this manner, the waveform of the signal of the phase-A plus the phase-B is likely to be uneven when the frequency is converted. Accordingly, according to the first embodiment, the switching frequency may be converted properly.

The frequency conversion unit 24 sets the designated value to convert the frequencies of the control signals having the phase-A and the phase-B. The phase shifting unit 30 changes the counter value of the carrier signal having the phase-B to thereby shift the phase of the carrier signal having the phase-B. By changing the designated value and the counter value in this manner, the frequency converting and phase shifting may be simply carried out.

When there exists a phase-B interrupt, the comparison value generator 23 starts a calculation for generating a comparison value. Accordingly, a comparison value may be set when a phase-A interrupt is introduced.

The phase difference between the control signal having the phase-A and the control signal having the phase-B is 180°. At this time, the phase shifting unit 30 shifts the phase of the control signal having the phase-B such that the following relationship is met: T3=(T1+T2)/2, where T3 denotes the period of the control signal having the phase-B when the phase-A interrupt is introduced, T1 denotes the period before the frequency is converted, and T2 denotes the period after the frequency is converted. Accordingly, the phase difference between the control signal having the phase-A and the control signal having the phase-B may be unchanged before and after the switching frequency is converted.

Second Embodiment

Figure 13:
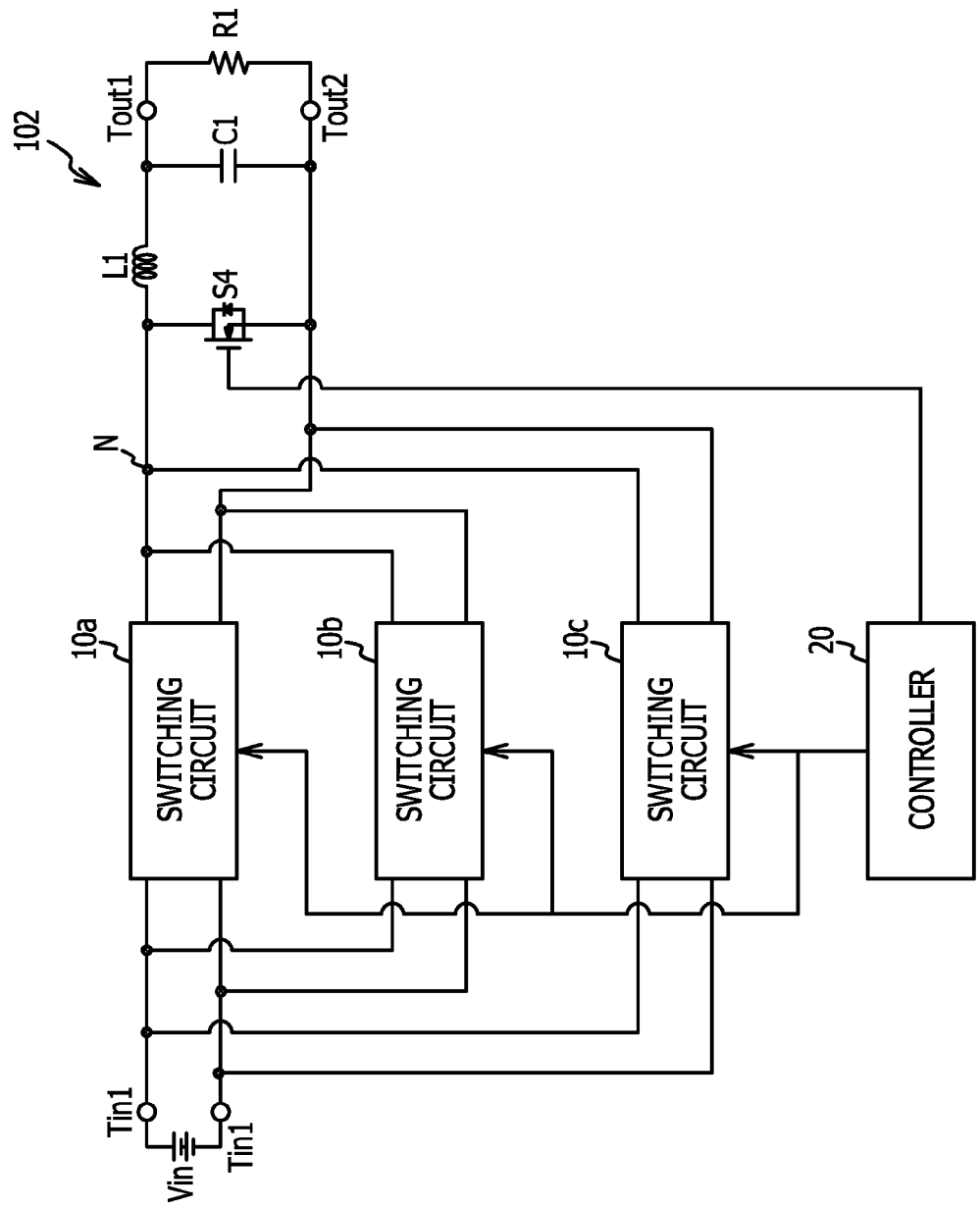
FIG. 13 is a view illustrating a block diagram of a power circuit according to a second embodiment of the present disclosure.

FIG. 13 is a view illustrating a block diagram of a power circuit according to a second embodiment. As illustrated in FIG. 13, the power circuit 102 further includes a switching circuit 10c (third switching circuit). The switching circuit 10c is connected in parallel to the switching circuits 10a and 10b between the input terminals Tin1 and Tint and the output terminals Tout1 and Tout2. The configuration of the switching circuit 10c is similar to that of the switching circuits 10a and 10b according to the first embodiment. Other elements of the second embodiment are similar to those of the first embodiment and, therefore, will not be described repeatedly.

Figure 14:
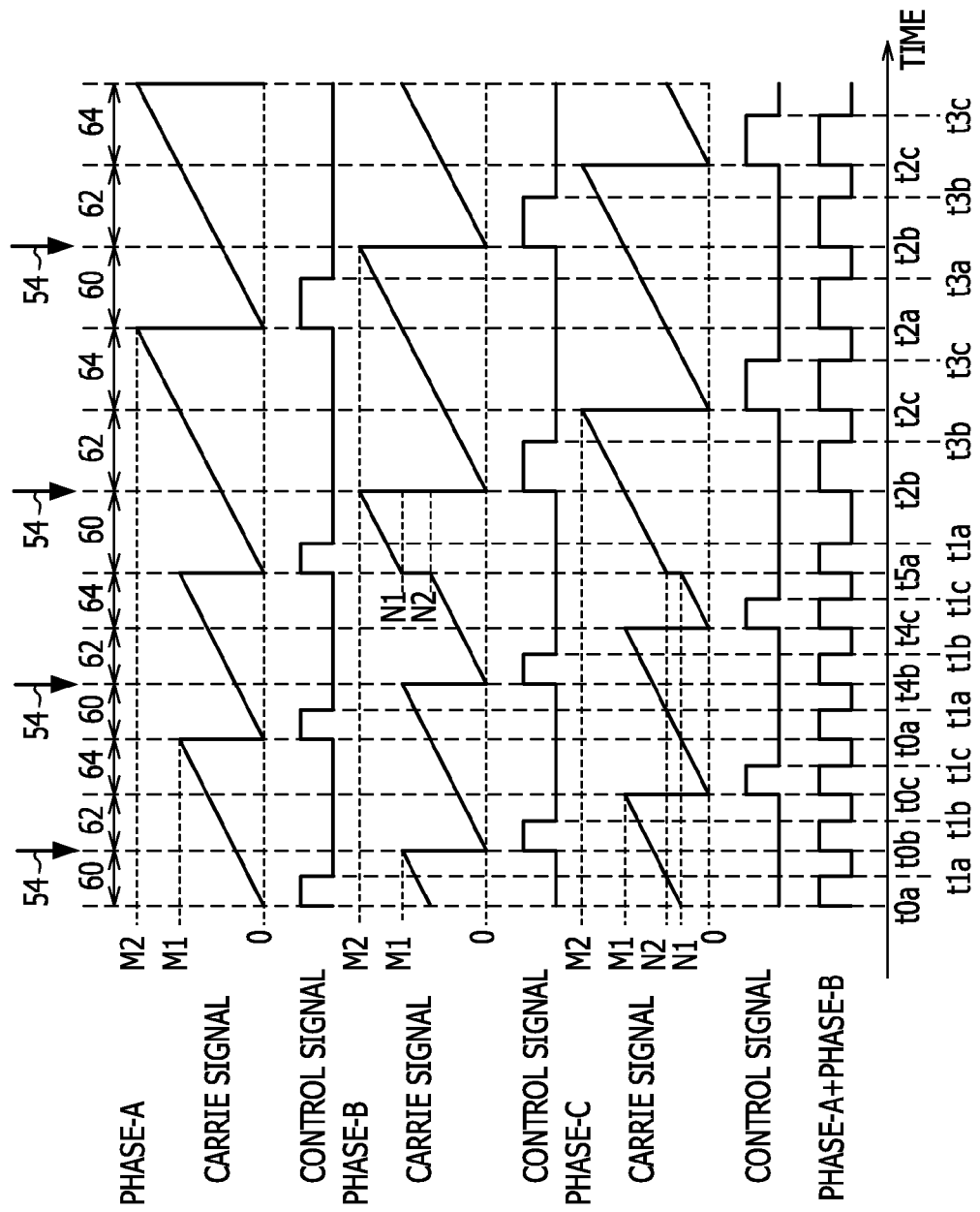
FIG. 14 is a timing chart illustrating a conversion of switching frequency according to the second embodiment.

FIG. 14 is a timing chart illustrating a conversion of the switching frequency in the second embodiment. The phase difference between phase-A and phase-B is 120°. The phase difference between phase-A and phase-C is 240°. When a phase-B interrupt is introduced, sampling is performed as indicated by arrows 54. The frequency conversion unit 24 converts the frequencies of the carrier signals having the phase-B, the phase-C and the phase-A in this order at times t4b, t4c and t5a, respectively. When a phase-A interrupt is introduced at time t5a, the phase shifting unit 30 shifts the phases of the carrier signals having the phase-B and the phase-C. Timings of other signals are similar to those of the first embodiment, and, therefore, will not be described repeatedly.

According to the second embodiment, the frequency conversion unit 24 converts the frequency of the carrier signal having the phase-C at time t4c, for example, before converting the frequency of the carrier signal having the phase-A at time t5a. After the frequency conversion unit 24 has converted the frequencies of the carrier signals having the phase-B and the phase-C, the phase shifting unit 30 shifts the phase of the carrier signal having the phase-B and the phase-C if there is a phase-A interrupt at time t5a. Accordingly, the switching frequencies may be converted properly also in the three-phase switching power supply.

The periods of the carrier signals having the phase-B and the phase-C are denoted by T3 and T4, respectively, when there exists the phase-A interrupt. When the phase difference between the phase-A and the phase-B is 120°, and the phase difference between the phase-A and the phase-C is 240°, the phases of the carrier signals having the phase-B and phase-C are shifted such that the following relationship is met: T3=(2×T1+T2)/3, and T4=(T1+2×T2)/3. Accordingly, the phase differences between the signals having the phase-A, the phase-B and the phase-C may be unchanged before and after the switching frequency is shifted.

Third Embodiment

According to the first and second embodiments, the comparison value generator 23 calculates a comparison value based on an output voltage. Accordingly, the comparison value immediately after the switching frequency is converted is equal to the comparison value immediately before the switching frequency is converted. Accordingly, at times t4b and t5a in FIGS. 9 and 10, the length of the period, in which the level of the control signal is high immediately after the frequency of the carrier signal is converted is equal to that before the frequency is converted.

Accordingly, in FIG. 9, the period of the signal having the phase-A after time t5a becomes long, but the control signal is turned OFF at time t1a. As a result, the duty ratio decreases. Accordingly, the intervals between ON-periods of the signal of the phase-A plus the phase-B become wider at locations 76. In FIG. 10, the duty ratio increases after time t5a. Accordingly, the intervals between ON-periods of the signal of the phase-A plus the phase-B become narrower at locations 78. A third embodiment of the present disclosure overcomes this issue.

Figure 15:
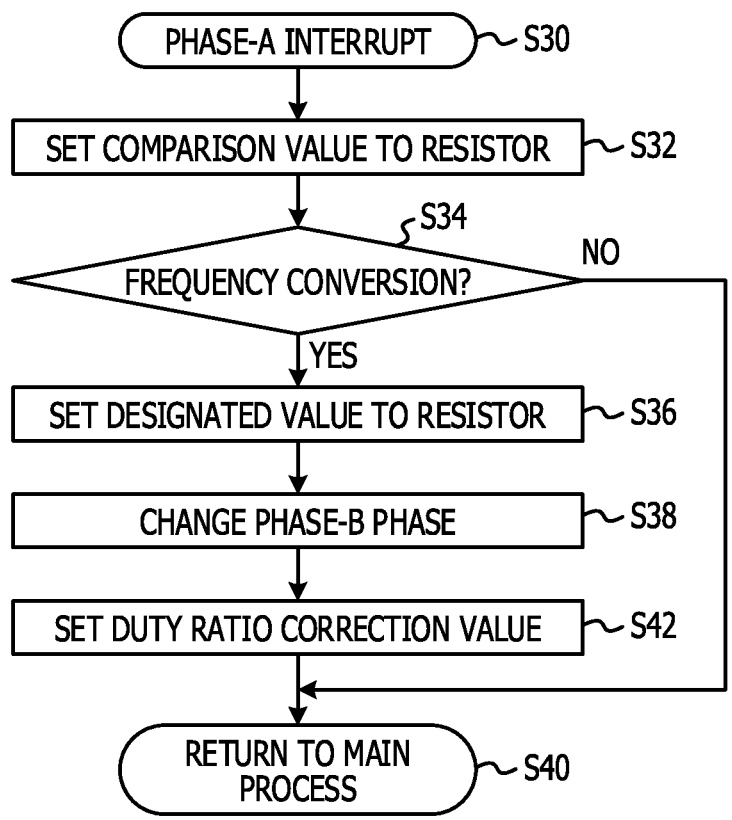
FIG. 15 is a flowchart illustrating processes by a controller when a phase-B interrupt is introduced in a third embodiment of the present disclosure.

FIG. 15 is a flowchart illustrating processes by a controller when a phase-B interrupt is introduced, in the third embodiment. As illustrated in FIG. 15, after step S38, the control signal generator 26 corrects the duty ratio of a control signal (step S42). Other processes are similar to those described with respect to FIGS. 8A to 8C, and thus the descriptions thereof will be omitted.

Figure 16:
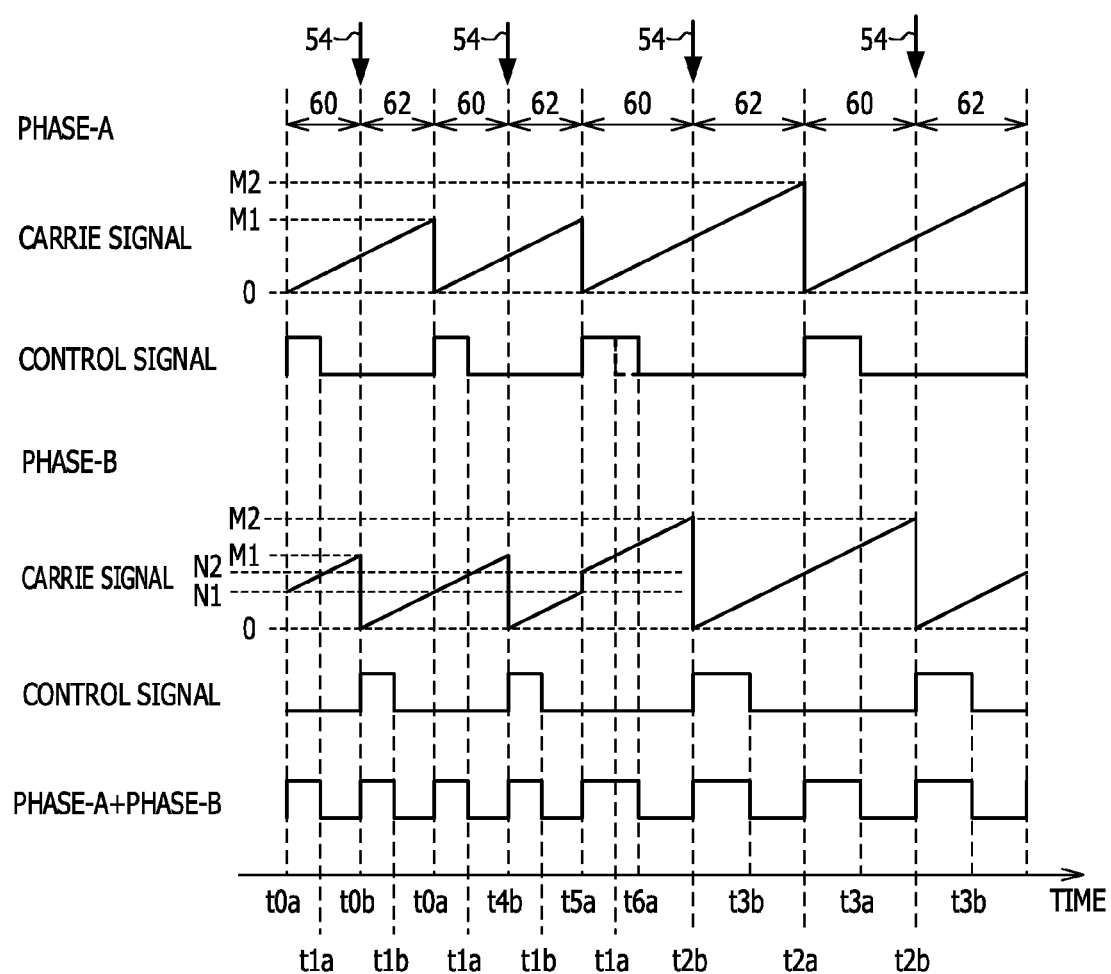
FIG. 16 is a timing chart illustrating a conversion of switching frequency according to the third embodiment.
Figure 17:
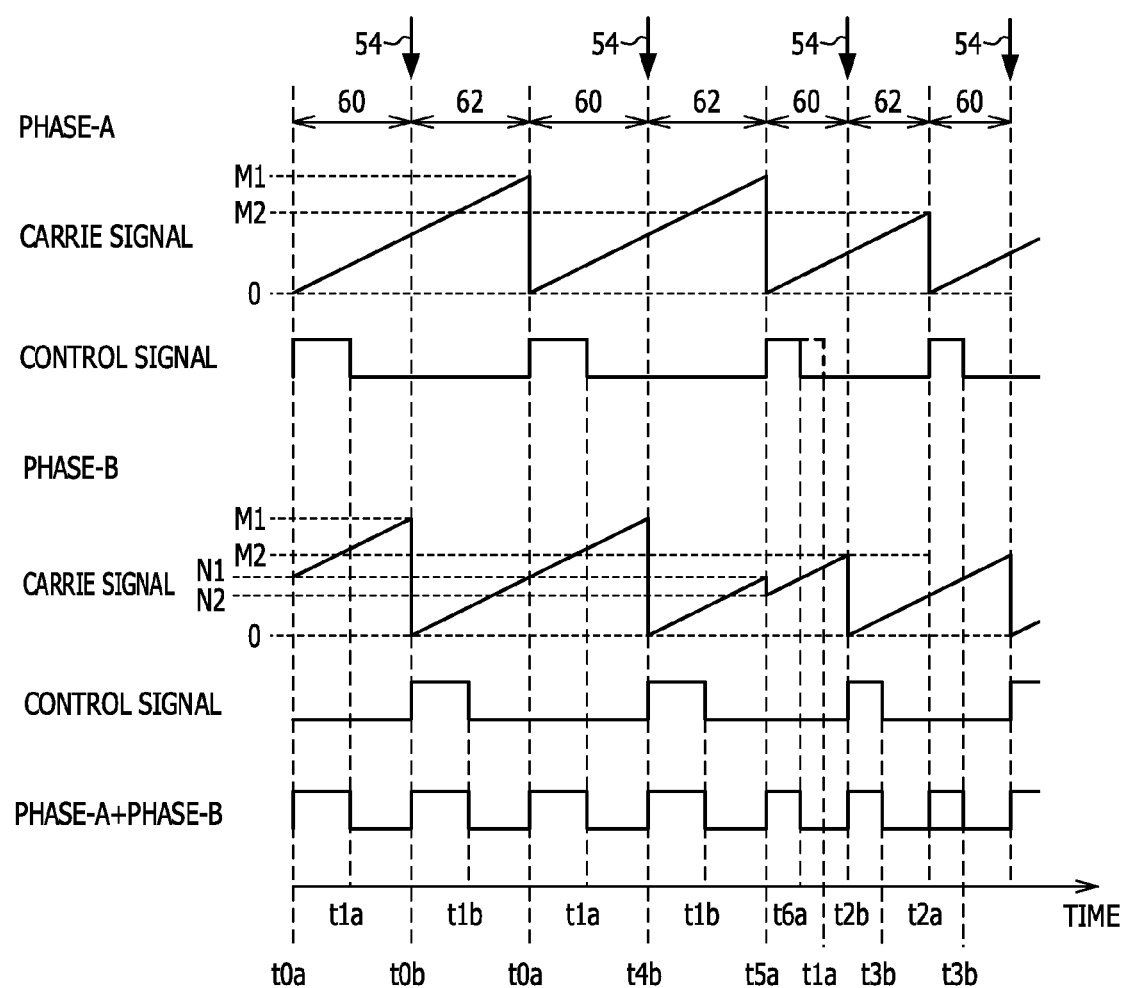
FIG. 17 is another timing chart illustrating a conversion of switching frequency according to the third embodiment.

FIGS. 16 and 17 are timing charts illustrating a conversion of the switching frequency according to the third embodiment. FIG. 16 illustrates an example of decreasing switching frequencies. FIG. 17 illustrates an example of increasing switching frequencies.

As illustrated in FIGS. 16 and 17, after a phase-A interrupt is introduced at time t5a, the control signal generator 26 turns OFF the control signal having the phase-A at time t6a. Accordingly, the duty ratio of the control signal immediately after time t5a becomes equal to that before the switching frequency is converted. In FIG. 16, time t6a at which the level of the control signal having the phase-A is LOW becomes later than time t1a in FIG. 9. In FIG. 17, time t6a at which the level of the control signal having the phase-A is LOW becomes earlier than time t1a in FIG. 10. The control signal generator 26 does not correct the duty radio of the control signal having the phase-B. Timings of other signals are similar to those of the first embodiment, and, therefore, will not be described repeatedly.

Figure 18:
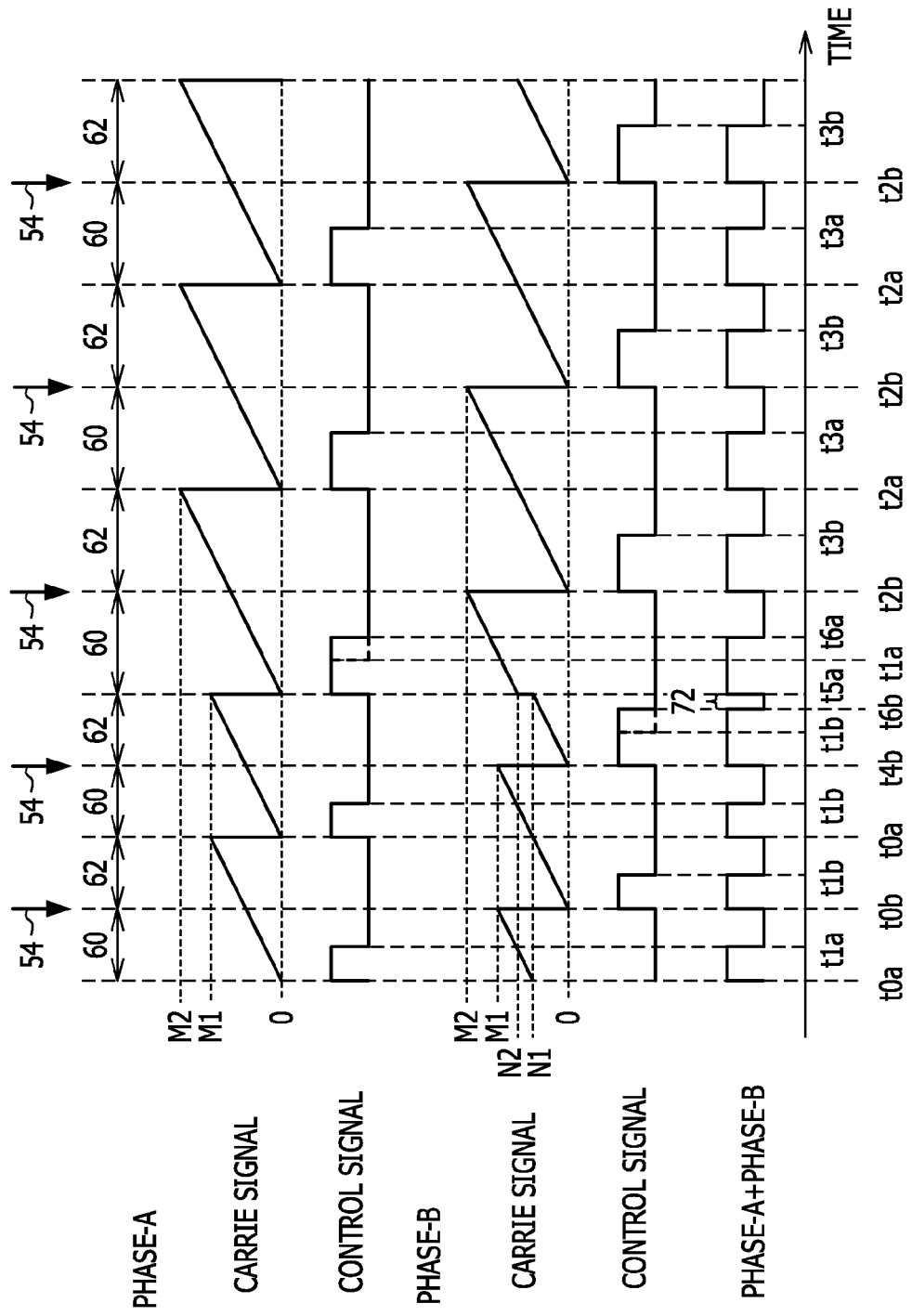
FIG. 18 is a timing chart illustrating a conversion of switching frequency according to a modification of the third embodiment.
Figure 19:
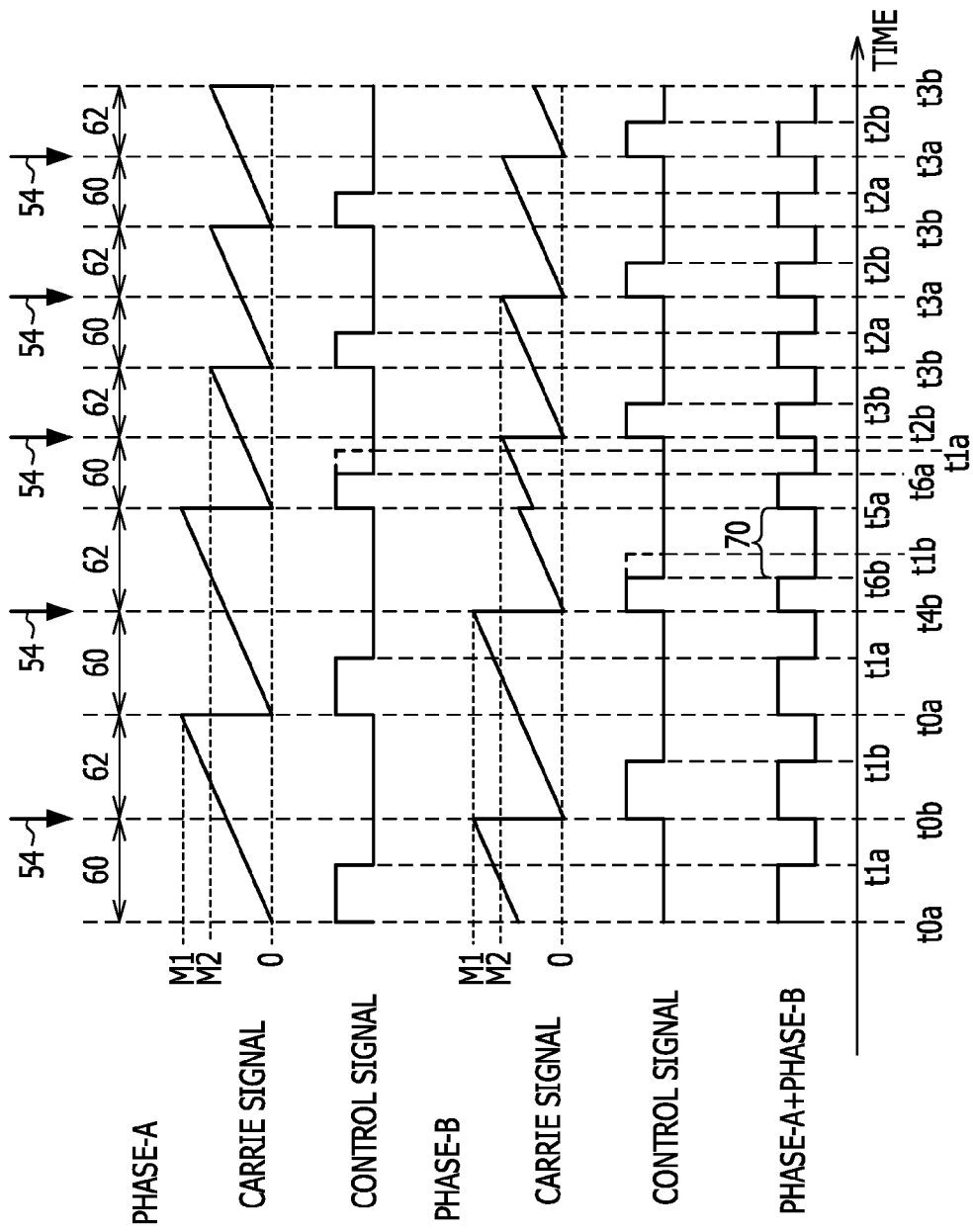
FIG. 19 is another timing chart illustrating a conversion of switching frequency according to the modification of the third embodiment.

A modification of the third embodiment will be described in which duty ratios of the control signals having the phase-A and the phase-B are corrected. FIGS. 18 and 19 are timing charts illustrating a conversion of the switching frequency according to the modification of the third embodiment. FIG. 18 illustrates an example of decreasing switching frequencies. FIG. 19 illustrates an example of increasing switching frequencies.

As illustrated in FIGS. 18 and 19, after a phase-B interrupt is introduced at time t4b, the control signal generator 26 turns OFF the control signal having the phase-B at time t6b. Accordingly, the duty ratio of the control signal immediately after time t4b becomes equal to that before the switching frequency is converted. Timings of other signals are similar to those of the third embodiment, and, therefore, will not be described repeatedly. As the duty ratio of the signal having the phase-B is corrected in FIG. 18, time t6b at which the level of the control signal having the phase-B is LOW after time t4b becomes later than time t1b in FIG. 16. Accordingly, the intervals between ON-periods of the control signal of the phase-A plus the phase-B becomes narrower at locations 72. In FIG. 19, time t6b at which the level of the control signal having the phase-B is LOW after time t4b becomes earlier than time t1b in FIG. 17. Accordingly, the intervals between ON-periods of the control signal of the phase-A plus the phase-B becomes wider at locations 70.

According to the third embodiment, the control signal generator 26 corrects the duty ratio of the control signal having the phase-A immediately after the frequency conversion unit 24 has converted the frequency of the carrier signal having the phase-B. The control signal generator 26 does not correct the duty ratio thereafter. The duty ratio is corrected such that the duty ratio of the control signal having the phase-A is not changed with the duty ratio of the control signal having the phase-A before the frequency is converted. As a result, the intervals between ON-periods of the signal of the phase-A plus the phase-B become even, compared to the modification of the third embodiment.

As in the modification of the third embodiment, if the control signal generator 26 corrects the duty ratio of the control signal having the phase-B, the intervals between the ON-periods of the control signals having the phase-A and the phase-B become uneven. Accordingly, the control signal generator 26 may not correct the duty radio of the control signal having the phase-B.

For example, in a period immediately after the frequency conversion unit 24 has converted the frequency from f1 to f2, the control signal generator 26 generates a control signal based on a value obtained by multiplying the comparison value maintained by the resistor 28 by f1/f2. Accordingly, the duty ratio of the control signal is substantially unchanged before and after the frequency is converted.

Fourth Embodiment

Figure 20:
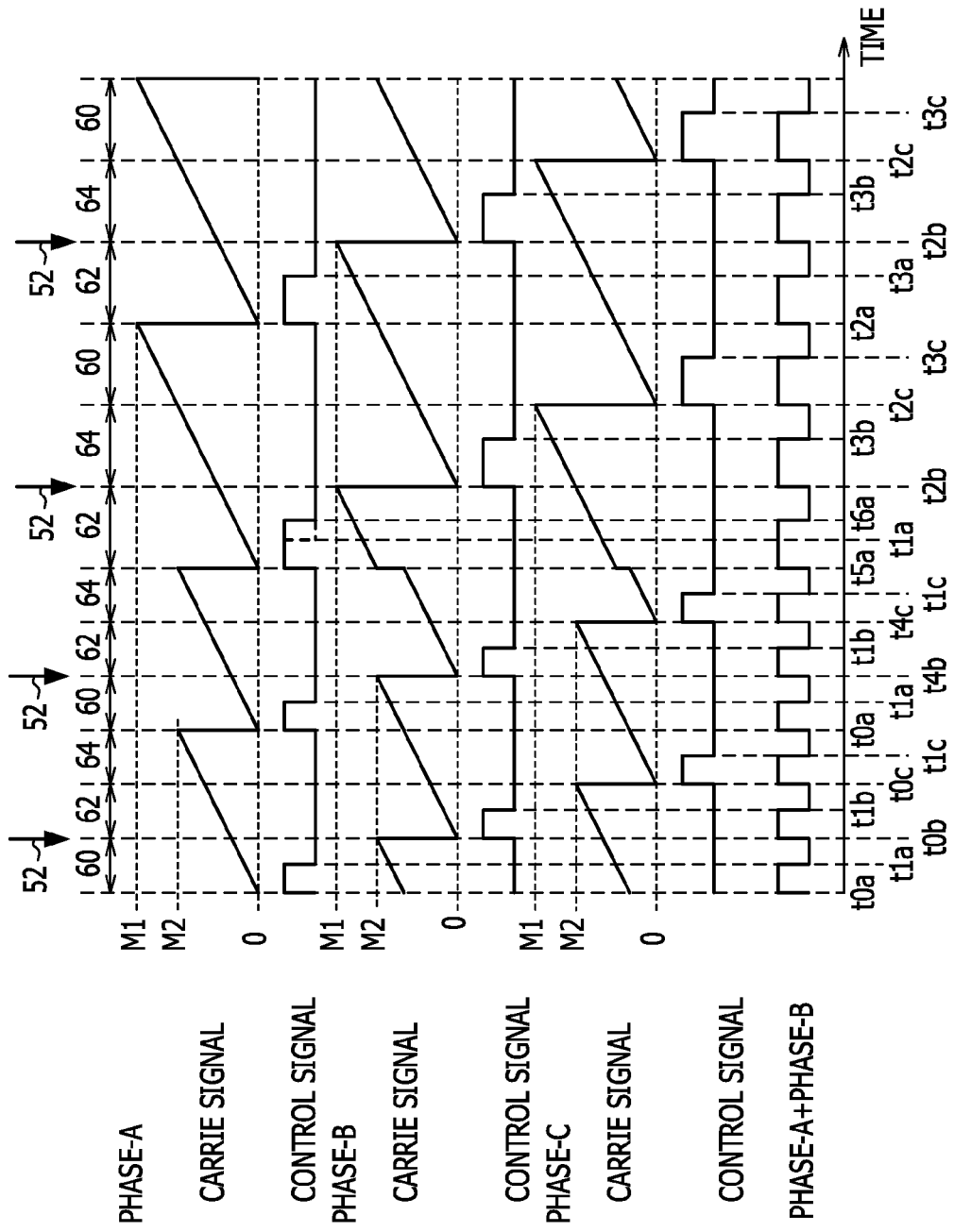
FIG. 20 is a timing chart illustrating a conversion of switching frequency according to a fourth embodiment of the present disclosure.

The block diagram of the fourth embodiment is similar to that of the second embodiment and thus will not be described. FIG. 20 is a timing chart illustrating a conversion of the switching frequency according to the fourth embodiment. As illustrated in FIG. 20, after a phase-A interrupt is introduced at time t5a, the control signal generator 26 turns OFF the control signal having the phase-A at time t6a. The control signal generator 26 does not correct the duty ratios of the control signals having the phase-B and the phase-C. Timings of other signals are similar to those of the second embodiment, and, therefore, will not be described again. As described with respect to the fourth embodiment, the duty ratio of the control signal having the phase-A may be corrected also in a three-phase switching power supply.

According to the fourth embodiment, the control signal generator 26 corrects the duty ratio of the control signal having the phase-A immediately after the frequency conversion unit 24 has converted the frequencies of the control signals having the phase-B and the phase-C. In this manner, the intervals between ON-periods of the signal of the phase-A, the phase-B plus the phase-C may become even also in the three-phase switching power supply.

In addition, the control signal generator 26 does not correct the duty ratios of the control signals having the phase-B and the phase-C. In this manner, the intervals between the ON-periods of the signal of the phase-A, the phase-B plus the phase-C may become evener.

The two-phase power supply has been described in the first and third embodiments, and the three-phase power supply has been described in the second and fourth embodiments. However, embodiments of the present disclosure may be applied to four or more phase power supplies.

Although the isolated DC-to-DC converter has been described in the first to fourth embodiments, a non-isolated DC-to-DC converter may be used as well. Although the step-down converter has been described, a step-up converter or a polarity inverting converter may be employed as well.

The number of switching frequencies to be converted may be two, three or more.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A power circuit comprising:
   first and second switching circuits coupled in parallel between an input terminal and an output terminal;
   a control signal generator that performs an ON/OFF control of the first and second switching circuits individually and generates a first control signal and a second control signal having different phases;
   a frequency converter that converts a frequency of the first control signal after converting a frequency of the second control signal; and
   a phase shifter that shifts a phase of the second control signal when a first interrupt is introduced as the first control signal is turned ON after the frequency converter has converted the frequency of the second control signal, wherein
   the control signal generator compares a comparison value with first and second carrier signals to generate the first and second control signals,
   the frequency converter converts frequencies of the first and second carrier signals to thereby convert the frequencies of the first and second control signals, and
   the phase shifter shifts a phase of the second carrier signal to change the phase of the second control signal.

2. The power circuit according to claim 1, further comprising:
   a timer counter that maintains a count value of a clock signal; and
   a carrier signal generator that increases or decreases the count value monotonously from an initial value and returns the count value to the initial value when the count value reaches a designated value in order to generate the first and second carrier signals.

3. The power circuit according to claim 2, wherein
   the frequency converter sets the designated value to convert the frequencies of the first and second carrier signals, and
   the phase shifter changes a count value of the second carrier signal in order to shift the phase of the second carrier signal.

4. The power circuit according to claim 1, further comprising:
   a comparison value generator that starts calculation for generating the comparison value when a second interrupt is introduced as the second control signal is turned on.

5. The power circuit according to claim 1, wherein the control signal generator makes a duty ratio of the first control signal equal to a duty ratio of the first control signal before the frequency converter converts the frequency of the second control signal.

6. The power circuit according to claim 5, wherein the control signal generator does not correct a duty ratio of the second control signal.

7. The power circuit according to claim 1, wherein a phase difference between the first control signal and the second control signal is 180°.

8. The power circuit according to claim 7, wherein the phase shifter shifts the phase of the second control signal such that:

$$T3=(T1+T2)/2,$$

wherein T3 denotes a period of the second control signal when the first interrupt is introduced, T1 denotes a period before the frequency of the second control signal is converted, and T2 denotes a period after the frequency of the second control signal is converted.

9. The power circuit according to claim 1, further comprising:
a third switching circuit coupled in parallel to the first and second switching circuits between the input terminal and the output terminal,
wherein the control signal generator performs an ON/OFF control of the third switching circuit, and generate a third control signal having a phase different from the first and second control signals,
the frequency converter converts a frequency of the third control signal before converting the frequency of the first control signal, and
the phase shifter shifts the phases of the second and third control signals when the first interrupt is introduced as the first control signal is turned ON after the frequency converter has converted the frequencies of the second and third control signals.

10. The power circuit according to claim 9, wherein a phase difference between the first control signal and the second control signal is 120°, and a phase difference between the first control signal and the third control signal is 240°.

11. The power circuit according to claim 10, wherein the phase shifter shifts the phases of the second and third control signals such that:

$$T3=(2 \times T1+T2)/3 \text{ and } T4=(T1+2 \times T2)/3,$$

wherein T3 denotes a period of the second control signal when the first interrupt is introduced, T4 denotes a period of the third control signal when the first interrupt is introduced, T1 denotes a period before the frequency of the second control signal is converted, and T2 denotes a period after the frequency of the second control signal is converted.

12. The power circuit according to claim 9, wherein the control signal generator makes a duty ratio of the first control signal that is equal to a duty ratio of the first control signal before the frequency converter converts the frequencies of the second and third control signals.

13. The power circuit according to claim 12, wherein the control signal generator does not correct duty ratios of the second and third control signals.

* * * * *